United States Patent [19]

Maley et al.

[11] 3,843,953

[45] Oct. 22, 1974

[54] APPARATUS FOR CONTROLLING FUNCTIONALLY SEVERABLE PARTS OF A COMPUTER SYSTEM

[75] Inventors: Gerald A. Maley, Fishkill; Jacob Riseman, Poughkeepsie, both of N.Y.

[73] Assignee: International Business Machines Corporation, Armonk, N.Y.

[22] Filed: Nov. 19, 1973

[21] Appl. No.: 416,909

Related U.S. Application Data

[63] Continuation-in-part of Ser. No. 267,351, June 29, 1972.

[52] U.S. Cl. ............................................ 340/172.5
[51] Int. Cl. ............................................ G06f 13/00
[58] Field of Search ................ 179/7.1 R; 340/172.5

[56] References Cited

UNITED STATES PATENTS

| | | | |
|---|---|---|---|
| 2,984,703 | 5/1961 | Hartley | 179/7.1 R |
| 3,001,021 | 9/1961 | Wright et al. | 179/7.1 R |
| 3,292,151 | 12/1966 | Barnes et al. | 340/172.5 |
| 3,535,560 | 10/1970 | Cliff | 340/172.5 |
| 3,629,842 | 12/1971 | Taylor | 340/172.5 |
| R27,285 | 2/1972 | Dreyer et al. | 340/172.5 |

*Primary Examiner*—Gareth D. Shaw
*Assistant Examiner*—Michael Sachs
*Attorney, Agent, or Firm*—William J. Dick

[57] ABSTRACT

Disclosed is apparatus in a computer for selecting the usage of functionally severable parts of the computer, for example, the amount of memory used by a computer having a plurality of memory partitions and an operating program such as the IBM OS/360 supervisor program for determining the allocation and activation of memory space. In the example given the apparatus includes an added register having a plurality of latches linking the ALU output bus to control by enabling or disabling selectively one or more memory partitions in accordance with usage dictated by the operating system program since the register contents are changeable only when the system is in the supervisor state. A meter is coupled to the memories to indicate elapsed time of use of the memory partitions so as to permit charging of a customer based upon usage.

The purpose of this abstract is to enable the public and the Patent Office to determine rapidly the subject matter of the technical disclosure of the application. This abstract is neither intended to define the invention of the application nor is it intended to be limiting as to the scope thereof.

6 Claims, 6 Drawing Figures

APPARATUS FOR CONTROLLING FUNCTIONALLY SEVERABLE PARTS OF A COMPUTER SYSTEM

This application is a continuation-in-part of the co-pending application Ser. No. 267,351, filed on June 29, 1972 now abandoned.

SUMMARY OF THE INVENTION AND STATE OF THE PRIOR ART

The present invention relates to apparatus for adding or removing functionally severable parts of a computer according to usage requirements and more particularly relates to apparatus for controlling the usage of functionally severable apparatus which is program controlled in a computer so that the customers' rental of the computer can be based on the usage time the computer, its memory partitions, and other functionally severable parts are actually used.

Throughout this disclosure the term functionally severable parts is meant to include those parts of a system of a given type which may be considered to be severable or separately added to a computer to carry out particular tasks. For example, and without any intention to be limiting, disc files, tape units, both paper and magnetic, printers, typewriters, card and paper tape punch devices, visual display devices and, of course, memory partitions. In the principal example given, the memory partition is used as one of the functionally severable parts.

In many computer applications the performance or throughput of the system is related directly to the size of the random access high speed memory. This fact has led many users to purchase or rent very large memories for their system requirements. On the other hand, there are applications that require only a small amount of memory as exemplified by programs which are so called "1/0 bound". To say that a computer is 1/0 bound means that only a simple calculation is required but that the computer must print out (as by a high speed printer, etc.) a large volume of information as a result of the calculation performed. In the instances where the computer becomes 1/0 bound, additional memory will do nothing to improve throughput and adds to the overhead of the system. Other examples where large memories are necessary are, for example, in the space program where it is necessary to use on, for example, one or two days of a week, the full capability of the memory of the particular computer, the memory in this instance extending into the megabyte capability. Other days only a small portion of the totally available memory need be used. Additionally, in most installations the type of problem being fed to the computer changes by the hour and in some cases by the minute making it difficult, if not impossible, for the computer manager to select the proper memory size for his particular installation.

The IBM System 360 Mod 30 is discussed hereinafter as a typical example of a computer system in which the present invention may be employed. In this system, the parts of which and the operation of which are well known to those skilled in the art, the simple addition of a memory control register comprising a set of latches corresponding in number to, for example, the memory partitions and directly in control of the operating control system (supervisor program) in conjunction with an interval timer, permits the operator of the computer system to minimize the rental fees while maintaining a highly efficient system under various memory requirements. Additionally, it should be recognized that the supervisor program can be utilized to control not only the number of partitions of random access high speed memory utilized for a specific task, but also the number of disc files, tapes, etc., necessary to carry out a particular job.

In view of the above it is a principal object of the present invention to provide an apparatus for controlling the usage of functionally severable and individually controllable parts of a computer.

Another object of the present invention is to provide apparatus such that when the system is in the supervision state, i.e., under control of the operating system program, the memory size of a computer for a given task may be changed to effect economies in accordance with job requirement.

Another object of the present invention is to control and meter the memory size of a computer so that a customer's rental of the computer may based on the number of byte-minutes actually used by the computer.

Yet another object of the present invention is to provide a novel manner of controlling memory size with the minimum of apparatus changes to the computer so as to minimize additional base cost of the apparatus.

Yet another object of the present invention is to give the control function of the memory size to the "supervisor program" to thereby permit analysis by the supervisor as to the quantity of memory placed on line during any particular job or jobs and to assign additional memory as required.

Other objects and a more complete understanding of the invention may be had by referring to the following specification and claims taken in conjunction with the accompanying drawings in which:

FIG.. 1 is a schematic block diagram of an IBM 360/Mod 30 data flow prior to modification in accordance with the present invention;

Figure 1:
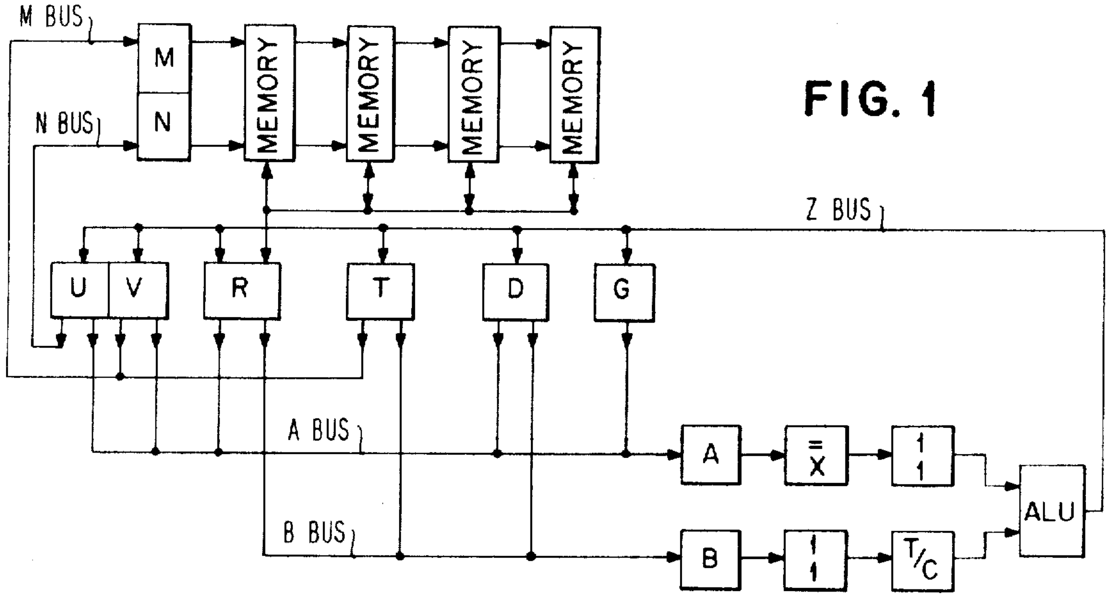

Referring now to the drawings, and especially FIG. 1 thereof, a portion of the IBM 360/Mod 30 data flow is illustrated therein. Typically, the Model 30 comprises a memory address register MN having two bit registers M and N which are connected to a random access high speed memory, in the present instance comprising cores, but which could also be of the monolithic (solid state) type and having a capacity of 32K to 64K bytes. The computer basically has three primary buses, and two memory address register buses called the M and N bus respectively. The primary buses comprise the A bus, B bus and the ALU output bus or Z bus. A plurality of single byte registers are connected to the various buses, the registers labeled U and V being the data address register and comprising two one byte registers; the R register being a single byte resiger used as a memory data register; the T register being a single byte register and used for register address; the D register being a general purpose register; and the G register being a single byte register for holding the operation code. It should be recognized that there are other registers associated with the various buses, for example a length register, a status register, and a pair of 8 bit or two byte registers to act as the instruction counter. As shown, the memory address register M N is coupled to at least the data address register, U V and the register address, register T. Both the A and B bus receive information, in the illustrated instance, from the single byte registers R, T, D and G while the data address register UV, and memory data register R gates an input only into one of the buses, in the illustrated instance the A bus. Each of the A and B buses feed into the arithmetic logic unit (ALU) which is part of the central processing unit (CPU) of the computer. The output of the ALU, in the present instance, is through the Z bus back to the various registers. Conventional temporary hold registers and functional gates are placed in the buses A and B before feeding information into the ALU. For example, the registers A and B permit the feeding of data from, for example, the D register to the ALU and then placement of the results back into the D register thereby preventing the reading out and gating in of information simultaneously in the D register. Additional gates include true/complement gates, half word gates, and half-word interchange gates, all being illustrated in the various buses immediately prior to entry of information into the ALU. The gates marked with an equal sign and an x or multiplication sign being the straight through and half-word interchange gate, the gate marked T/C being a true complement gate; and the gates with the vertical lines one above the other being high-low order gates.

As may be apparent from the foregoing, and from FIG. 1, the data address or UV 2-byte register addresses the memory address register MN for fetching data from the memory and placing it into the R or memory data register. The flow of information therefore is from the R register through either the A or B bus into the ALU and back into one of the various registers T, D, G or even UV or R. For example, the fetching of a 4-byte field from memory and its addition requires four iterations of fetching a byte each from memory and from register R and then adding them in the ALU. Thus each of the registers is, in the illustrated instance, loaded from memory and thus from the memory data register R, when the appropriate instruction is fetched. This requirement in the Mod 30 for transfer between the physical registers, is met by attaching all registers to the adder via the A bus, in the actual instance a set of nine wires running from the registers to the A bus, which drives one of the ALU inputs. Similarly, the output from the ALU is led back to each register by the Z bus. It should be noted, that between each bus and each register, in the Mod 30, is a 9-bit gate, consisting of 9 AND circuits. The input of each of the AND circuits is set from the control store (not shown); the other is the particular data bus line being gated. A complete description of the operation and computer organization of the Model 30 may be found in the book "Automatic Data Processing" System/360 Edition by Frederick P. Brooks, Jr. and Kenneth E. Iverson published by John Wiley and Sons, Inc., 1969 the elementary sequential operation of the apparatus illustrated schematically in FIG. 1 being illustrated at page 259 et seq. thereof.

In the System 360 design, the operating system for System/360 (known as OS/360) comprises a library of programs which when utilized in conjunction with any of the IBM 360 computers (except specials) gives an articulated response to a composite set of needs. OS/360 answers the needs of a System/360 configuration with a standard instruction set and 32,000 or more bytes of main storage.

A complete description of the functional structure of the OS/360 is set forth in IBM Systems Journal, Volume 5, No. 1, 1966. Additionally, the complete IBM OS/360 is placed on magnetic tape and is available. Briefly, the supervisor state is employed by OS/360 for the supervisor portion of the control program. All OS/360 programs with the exception of the supervisor operate in the problem state. In fact, one of the fundamental design tenets is that these programs (compliers, sorts or the like) are problem programs and must be treated as such by the supervisor portion of the control program. The same facilities is offered to both the system and problem programs. At any point in time, the system consists of its given supervisor plus all programs that are available in on-line storage. Inasmuch as any particular installation may introduce new compilers, payroll programs, etc., the extended machine may grow.

The supervisor program of the OS/360 in a very general sense watches over the computer, by watching over both the input and the output of the computer and the execution of the problem programs being used in the computer. As such, the supervisor program is the most important program in the computer and serves to allocate main storage (memory); load programs into main storage or memory; control the simultaneous execution of tasks, provide clocking services so as to cut off a run as dictated by the user; attempt recoveries from exceptional conditions; log and note errors which occur during the running of a program; provide summary information on the use to which the computer is being placed during any one interval of time; and issue and monitor input and output operations. The supervisor program normally obtains control of the CPU (Central Processing Unit) by way of an interruption. The interruption comes from an explicit request for services, or it may be implicit in the system conventions, such as when an interruption occurs at the completion of an input/output operation. Additionally, the data access routines required by the data management function are coordinated by the supervisor. The access routine available at any given time are determined by the requirements of the users program, the structure of the given data sets, and the types of input/output devices in use.

Thus the supervisor program has the information available and control of program loading as well as access to facility usage which enable it to choose the memory size in an efficient manner inasmuch as it always knows how much memory is being used to solve problems at any given time.

Figure 3A:
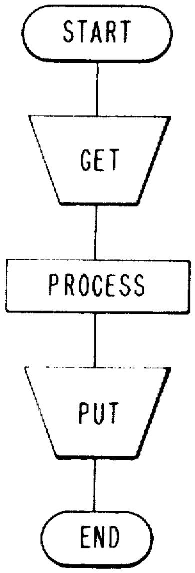
FIG. 3A–3C is a schematic representation of the manner in which a problem program is handled by a computer under control of the supervisor program.
Figure 3B:
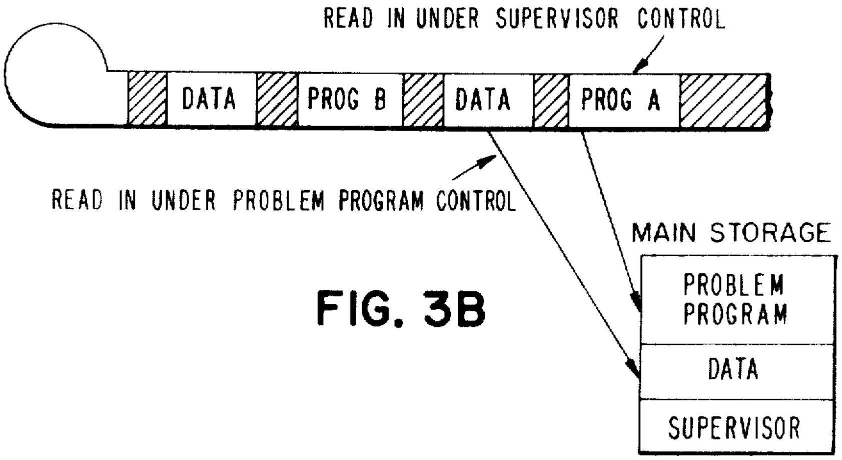
Figure 3C:
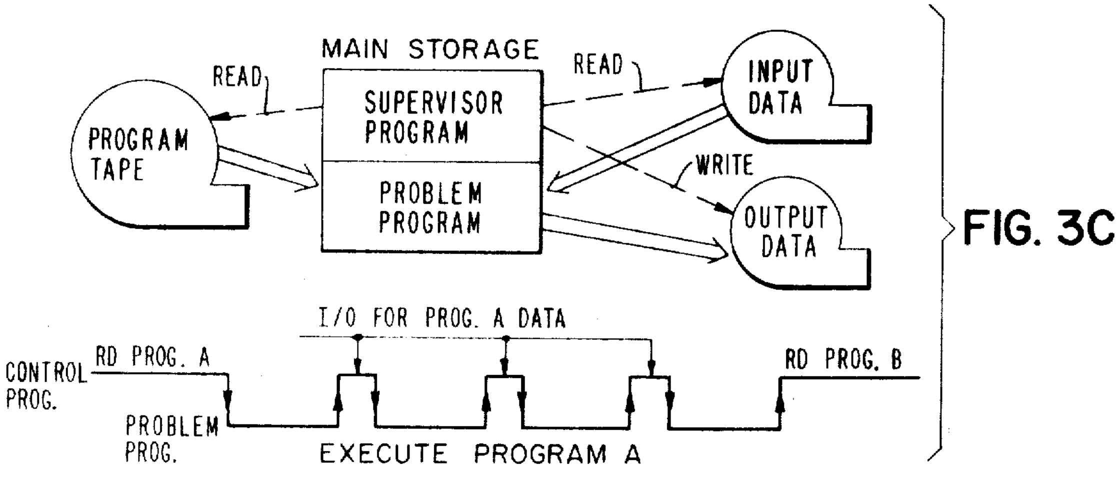

Prior to discussing the present invention in more detail, it may be helpful, with the aid of FIGS. 3A—3C to illustrate how a program operates and how the input-output (I/O) is controlled by the supervisor program.

As set forth above, the supervisor program is in a very real sense a control program which remains (at the least the principal parts thereof) in memory at all times. In paring down the principal purpose of the supervisor program, the basic functions are to control the inputs and outputs to and from the computer and to handle interruptions which are either externally promalgated or promalgated by an occurrence within the computer such as the completion of a job, etc.

By way of review, a program is a sequence of instructions designed to solve a specific problem. For example, a payroll problem program could give the instructions of: (1) get an employee's record, (2) calculate gross and net pay, and (3) put the results out in the form of a paycheck. The payroll program then gets the next employee's record and repeats the process. This sequence of instructions continues until all of the employees records are processed. Of course this is a simplification of a payroll problem. However, most programs are similar to the payroll example in that they can be broken down into their three basic operations; i.e., get the record, process the record, and put the record into an output file. Problem solving programs are referred to as problem programs, the logic of which is set forth in FIG. 3A.

Another example of a problem program is an assembly program. Here the problem is somewhat different, but the basic operations that are performed are identical. The problem would comprise: getting a symbolic (source language) statement, processing it by translating the statement into machine language, and putting the results in the output file (object program).

During the past decade, data processing machines have been developed with faster and faster internal processing speeds. This has resulted in the execution times for these problem programs being continually reduced with no corresponding reduction in the time that it takes for an operator to load into the computer the next problem program and manually set up the input data. In certain data processing installations, the average set up time is about equal to the average execution time. Thus the data processing system is idle about half the time while the computer operator is setting up for the work problem program. As may logically be seen, this is an inefficient way to control an installation.

In an attempt to reduce this idle time and keep the system running, programmers began to use stored programs to control the execution of problem programs. These programs were called "control programs" or "supervisor programs." The control programs were first written only for the requirements of a particular installation but later as the similarities between control programs became obvious, some computer manufacturers such as International Business Machines began to supply generalized control programs which could be tailored to the requirements of each installation.

A simple supervisor program would, for example, and as illustrated in FIG. 3B, control the loading of problem programs, and operate in the following manner: an input tape is prepared, this tape containing the problem programs and associated data. Although the supervisor program is typically in main storage in the computer, it should be recognized that it may be loaded into main storage from, for example, a second tape. The control program loads the first problem program and then passes control (via a branch) to the problem program. The problem program reads into the main memory its data and with the aid of the CPU performs its assigned task. When the problem program is finished, it does not issue a halt instruction, instead it passes control (again by branching) back to the control program. The control program then loads in the next problem program and passes control to it. This operation continues until all problem programs have been executed.

The above is only one example of a function of the supervisor program. Other functions, however, may be included as part of the supervisor program. For example the initiation of input-output (I/O) operations. The problem program is mainly interested in processing data. The actual read and write operation necessary to transfer data between input and output devices and main storage are handled by the control program, a typical example of which is illustrated in FIG. 3C.

In this I/O handling function of a supervisor program, control passes back and forth between the problem and supervisor during the execution of the problem program. In the example given relative to FIG. 3B, the only time the supervisor program was in control was between jobs. However, as shown in FIG. 3C, this control program not only reads in new problem programs but it also (during the execution of the problem program) is used to start the necessary I/O units for input-output data.

An interruption terminates the current sequence of instructions and causes a machine forced branch to the supervisor program. An interruption results in storing of the current program status word (PSW) in main storage and fetching of a new program status word (PSW) from main storage. Processing resumes at the instruction address specified by the instruction address portion of the new program status word (PSW), which now becomes the current program status word (PSW).

There are five distinct classes of interruptions, each of which has both an old and a new program status word location in main storage. These five distinct classes of interruptions are as follows: external — can be caused by pressing the interrupt key on the system console; Supervisor — caused by the supervisor call instruction; Program — caused by a program check; Machine — caused by a machine check; I/O — caused by an input output operation.

As noted above, when the current sequence of instructions is interrupted, an automatic branch is taken to a new sequence of instructions.

Figure 2:
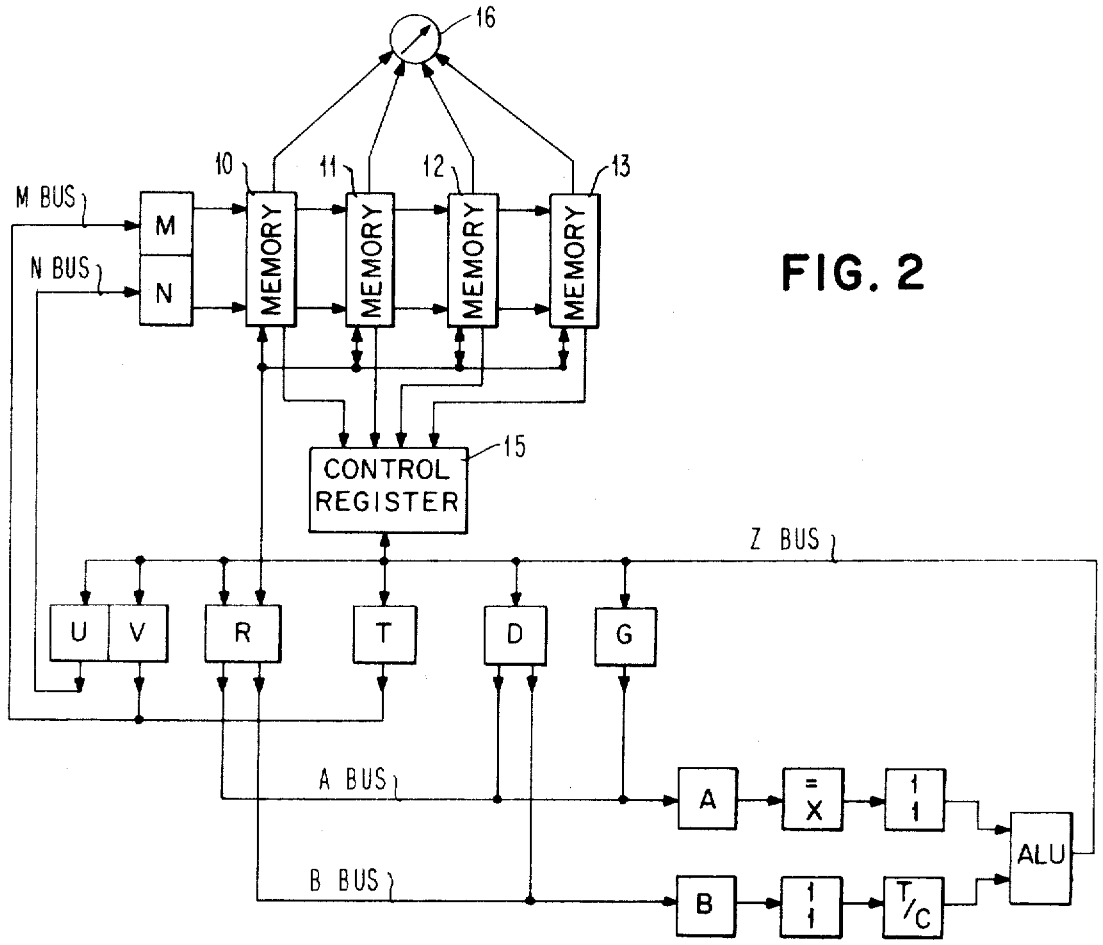
FIG. 2 illustrates a modified IBM 360/Mod 30 computer illustrating the additional apparatus necessary to modify the machine in accordance with the present invention.

In accordance with the invention, means are added to the conventional computer to permit the supervisor program to select and efficiently control the functionally severable parts, in the illustrated instance the amount of memory necessary to run a given task in a given time. To this end, and as best illustrated in FIG. 2, a portion of an IBM 360/Mod 30 data flow, which has been modified in accordance with the invention, is illustrated therein. As shown, the system includes a full complement of memory or storage cells, in the illustrated instance between divided into four 16K byte partitions 10, 11, 12 and 13. By adding a memory control register 15 between the Z bus and the various memory partitions 11–13, which register may be controlled by the control store (not shown), or in the instance of larger machines by control circuits, selective ones of the memory partitions may be placed into usage when desired by the supervisor program. The memory control register 15 may be comprised of a simple set of latches such as polarity hold latches or automatic reset type latches (see "Manual of Logic Circuits" by Gerald Maley, Prentice Hall, 1970) and in its simple form would contain at least one such latch for each of the memory partitions. Other than that modification the system requires nothing further except to add one instruction to the supervisor program as explained hereinafter. The added instruction is executed when the supervisor program is loading programs into main storage and allocating main storage for a particular task or problem, the supervisor program will load the control register 15 so as to, for example, set the necessary latches to place certain of the memory partitions "on the line" to handle that particular job. This will occur, for example, when a new or additional problem program is given to the computer by the computer operator causing an interrupt to occur, stopping the calculations, etc., being performed by the CPU. At this time, the supervisor program, which has kept track of how much of the main memory is being used for input and output purposes as well as current calculations, knows, by the new inputting program request, whether sufficient memory is available to store the data and problem program or whether additional memory is necessary. If necessary, control register 15 is set and additional memory is put "on line" for receiving the new data and problem program.

By way of definition, and from the foregoing brief summary of how a problem program interacts with the supervisor program of a computer, it should be defined that the "supervisor state" of a computer is when an instruction is given that only the supervisor program can carry out.

Figure 4:
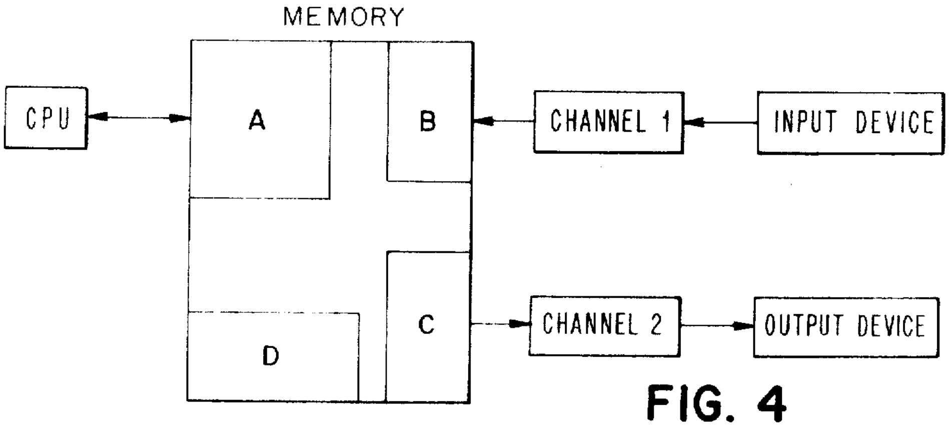
FIG. 4 is a schematic illustration of an example of how the apparatus of the present invention functions to control the size of, in the illustrated instance, the memory of an IBM 360/Mod 30 computing system.

As heretofore set forth, it is not an unusual occurrence for the memory to be partitioned (on paper) by the supervisor and for these partitions to be allocated and reallocated to various problem programs as they pass through the machine. Thus a memory content map may appear as illustrated (from a schematic standpoint) in FIG. 4. As shown in the block diagram of FIG. 4, in the portion of the memory designated A a problem program is being executed by the CPU. In the section of the memory designated B, a problem program is being loaded into that memory area by channel 1 and for purposes of the example, assume that this operation is consuming every other memory cycle. Further assume that many additional problem programs are backed up in the input device. Further assume that data is being unloaded from memory area C and this operation is consuming every fourth memory cycle. The CPU in conjunction with memory section A is consuming the remaining memory cycles. Area D (memory area) is that portion of the main memory set aside by the supervisor program to contain at least a portion of the supervisor program and particularly that portion which may be needed quickly to handle interrupts.

Assume that channel 1 completes its operation and memory area B now contains a complete program with data. In completion of this channel operation will, as it does in most computers, cause an interrupt. An interruption, as heretofore explained, means that the problem program being executed by the CPU is suspended and the CPU starts execution of the supervisor program. This, of course, activates memory area D of the main memory. The supervisor program determines from the interrupt that channel 1 has completed its task of loading a problem program. Normally the supervisor sensing that there are more problem programs to be read in (for example cards still in the hopper, etc.) will look for an open memory area to assign the next input problem. If no such available area exists, the supervisor in state of the art computers suspends operation of channel 1 and returns the CPU to working on the problem in memory area A. Channel 1 will only be reactivated by an interruption, say by channel 2 informing the supervisor that memory area C is now clear and can be reassigned. By the apparatus of the present invention the supervisor now has an alternative to suspending channel operation when memory space is exhausted. The supervisor can elect to change the amount of memory that is powered up in the system. The supervisor program can, by changing the contents of the control register 15 (FIG. 2) cause power to be brought up in additional memory units making them available for assignment by the supervisor. The supervisor is therefore provided with a new instruction LCR (Load Control Register). When this invention is executed the contents of this new register will be changed to the value contained in the address section of the instruction. For example, LCD9 will place the binary member 9 (1001) in the control register and cause power to be brought to the first nine memory units. If at some later time the instruction LCD 12 or LCD 8 is given, power will be brought to the first twelve units or the first eight units respectively.

Thus the computer system includes a supervisor program for controlling the number of functionally severable parts (in the example given, memory partitions) available for use, and operable during the supervisor state to change that number. The apparatus, as described, comprises a simple control register for activating at least one of the functionally severable parts and being responsive to a determination by the supervisor program that a change in the number of parts is necessary to accomplish the task to change the contents of the register and thereby activate that one part.

If desired, an interval timer may be connected to the memories as for example the meter 16 which is connected to each of the memory partitions 10–13. The timer may be a simple clock such as the presently incorporated interval timer which is placed in all System 360 computers, or it may be of the type similar to a Wattmeter to indicate the power consumption of the particular memory partitions on the line. Additionally, the normal interval timer found in all System 360 and in most computers, (see page 205 et seq. of "Automatic Data Processing" System/360 edition) may be utilized to indicate elapsed time of use of the memory partitions and compute thereby the byte-minutes that the system is on the line or utilized for a particular task or job.

It should be recognized that the memory control register 15 may be connected in various ways to the memory partitions. For example, if the memory employed is monolithic, a simple reduction in power to the memory not selected for a given task will suffice to lower the power consumed in a Wattmeter type clocking arrangement. Alternatively, the memory control register 15 may be connected to the data input or data output of each of the memory partitions and control, by opening or closing, data in or out of the memory partitions. In this arrangement, the supervisor program will then, in conjunction with the existing interval timer, record the time any particular or all memory partitions are on the line. It will be recognized that the latter arrangement is to be preferred when the memory partitions comprise core storage.

In certain instances a computer will, when executing serial and consecutively higher addresses cause an overflow in the address register resulting in the addressing to revert back or wrap to the low order address end of the memory. For example a 100 word memory having addresses from 0–99 would be said to wrap when, for example, 5 words were requested to be stored in consecutive increasing memory locations starting at address 97. Thus a wrap would occur on the storage of the fourth word, resulting in its placement at location 0. If this occurs in an IBM System 360, the "wrap latch " signals the supervisor program that the memory address has been increased to a point that overflow has occurred. The supervisor program can then decide whether additional partitions of memory are to be activated to prevent overflow and permit the flow of additional information into a second or third, as it may be, memory partition. The wrap latch, its complete description as part of the apparatus and functional structure is illustrated in the IBM Field Engineering Manual 2030 Processing Unit, System/360 Model 30, Manual No. SY 24-3360-3, pages 2–43.

It should be recognized that the apparatus of the present invention may be utilized in conjunction with other functionally severable parts of a computer. For example, a control register may be placed intermediate a sequential memory of a given type such as disc file or a tape unit so that the customer, with a conventional interval timer, may be billed for only those disc files on premises that are actually being used. In a like manner, the remainder of the system such as other input or output devices, including printers, typewriters, etc. may be controlled by a control register to record time of use and permit charging therefore based upon the usage time as opposed to rental of the equipment in and of itself.

Thus the present invention provides a simple modification to a computing system to enable the customer to be charged, on a rental basis, for only that portion of the machine which he uses thereby giving an inherent advantage to the user to have a more flexible system will accommodate both the peak and low usage periods.

Although the invention has been described with a certain degree of particularity, it is understood that the present disclosure has been made only by way of example and that numerous changes in the details of construction, the combination and arrangement of parts, and the method of operation may be made without departing from the spirit and the scope of the invention as hereinafter claimed.

What is claimed is:

1. In a computer system, including an arithmetic logic unit and having a partitioned memory, and further including a supervisor program for determining the number of memory partitions to be used for a given task, apparatus for activating selected memory partitions of said system, said apparatus operable during the supervisor state of said system, said apparatus comprising a control register for activating at least one of said memory partitions said control register being responsive to a signal from the ALU representing a determination by said supervisor program of said number of memory partitions to be used to accomplish said task to change the contents of said register and thereby activate said at least one memory partition, and means for measuring the total time memory partition is used to accomplish said task.

2. A computer system in accordance with claim 1 wherein said memory partitions comprise sequential memories.

3. A computer system in accordance with claim 2 wherein said sequential memories comprise disc files.

4. A computer system in accordance with claim 2 wherein said sequential memories comprise magnetic tape units.

5. A computer system in accordance with claim 2, wherein said memory partitions comprise a plurality of monolithic memories.

6. A computer system in accordance with claim 2, wherein said memory partitions comprise a plurality of core memories.

* * * * *